US007698041B2

(12) United States Patent
Streib

(10) Patent No.: US 7,698,041 B2
(45) Date of Patent: Apr. 13, 2010

(54) METHOD FOR OPERATING A DRIVE UNIT

(75) Inventor: Martin Streib, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 1323 days.

(21) Appl. No.: 11/171,108

(22) Filed: Jun. 29, 2005

(65) Prior Publication Data

US 2006/0009899 A1 Jan. 12, 2006

(30) Foreign Application Priority Data

Jun. 29, 2004 (DE) ....................... 10 2004 031 312

(51) Int. Cl.
*G06F 7/00* (2006.01)
*G06F 17/00* (2006.01)

(52) U.S. Cl. ............................. 701/51; 701/54; 701/84; 701/66; 701/87; 701/90; 477/20; 477/27; 477/54; 477/73; 477/107; 477/115; 477/174; 477/200; 477/209; 318/434; 475/125; 702/41; 74/5.47; 74/337; 74/335

(58) Field of Classification Search ................... 701/51, 701/54, 84, 66, 87, 90; 477/107, 115, 20, 477/27, 54, 73, 200, 209, 174; 318/438; 475/125; 702/41; 47/5.47, 337, 335
See application file for complete search history.

(56) References Cited

U.S. PATENT DOCUMENTS 4,107,776 A * 8/1978 Beale .......................... 701/99
4,353,272 A * 10/1982 Schneider et al. ............. 477/43
4,515,040 A * 5/1985 Takeuchi et al. .............. 477/43
4,735,114 A * 4/1988 Satoh et al. .................... 477/43
4,905,544 A * 3/1990 Ganoung ..................... 477/109
5,150,635 A * 9/1992 Minowa et al. ............... 477/43
5,343,781 A * 9/1994 Minowa et al. ............. 477/107
5,468,196 A * 11/1995 Minowa et al. ............... 477/62
5,746,679 A * 5/1998 Minowa et al. ............... 477/92
6,102,831 A * 8/2000 Wakahara et al. ........... 477/169
6,151,542 A * 11/2000 Yoshino et al. ............... 701/54
6,165,102 A * 12/2000 Bellinger ..................... 477/54
6,287,237 B1 * 9/2001 Graf et al. ...................... 477/94
6,349,253 B1 * 2/2002 Bellinger ...................... 701/53
6,360,154 B1 * 3/2002 Krenn et al. .................. 701/54
6,468,183 B1 * 10/2002 O'Neil et al. ............... 477/107
6,543,414 B2 * 4/2003 O'Neil et al. ............... 123/350
7,493,203 B2 * 2/2009 Bitzer et al. .................. 701/51
2002/0132699 A1 * 9/2002 Bellinger .................... 477/107
2003/0216847 A1 * 11/2003 Bellinger ...................... 701/51
2005/0085980 A1 * 4/2005 Kawashima et al. .......... 701/53
2005/0227809 A1 * 10/2005 Bitzer et al. .................. 477/37

FOREIGN PATENT DOCUMENTS

DE 42 04 401 8/1993
DE 43 33 899 1/1995

* cited by examiner

*Primary Examiner*—Khoi Tran
*Assistant Examiner*—Jorge O Peche
(74) *Attorney, Agent, or Firm*—Kenyon & Kenyon LLP

(57) ABSTRACT

A drive unit includes an engine and a transmission having a variable transmission ratio. An instantaneous setpoint power output quantity of the drive unit is determined from an intended power output. The setpoint power output quantity is a function of the instantaneous transmission ratio of the transmission at least for a given intended power output.

12 Claims, 6 Drawing Sheets

METHOD FOR OPERATING A DRIVE UNIT

FIELD OF THE INVENTION

The present invention first relates to a method for operating a drive unit which includes an engine and a transmission having a variable transmission ratio, in which an instantaneous setpoint power output quantity of the drive unit is determined from an intended power output. The present invention also relates to a computer program, an electric memory medium, a control and/or regulating device for an internal combustion engine, and an internal combustion engine.

BACKGROUND INFORMATION

A drive unit having an engine and a transmission having a variable transmission ratio is present, for example, in today's typical motor vehicles. Transmissions having a plurality of driving positions, i.e., gears, are used as transmissions. The intended power output may be expressed, for example, by the angular position of a gas pedal and normally corresponds to an intended torque. The setpoint power output quantity may be the setpoint output torque of the drive unit which is to act upon the wheels of the motor vehicle. The actual output torque is generated by appropriate control and/or regulation on the basis of the setpoint output torque. It is understood that here and hereinafter the term "intended power output" means not only a desired power output or a desired torque, but also further quantities which affect the operation of the internal combustion engine.

In automatic transmissions, for reasons of comfort, it is desirable that, when shifting from one driving position or one gear to another without changing the intended power output, the output torque applied to the wheels of the motor vehicle is not also changed to avoid a "shifting jolt." German Published Patent Application No. 43 33 899, for example, describes a method for achieving this object. German Published Patent Application No. 42 04 401 also describes a method for avoiding the shifting jolt when shifting gears.

However, consistent implementation of this method in certain situations may result in more power being generated than necessary for operating the vehicle when the driver intends to stop the vehicle. The reason for this is that the minimum possible output torque of the drive unit varies abruptly from one gear to another. This minimum possible output torque—a braking torque in most operating situations of a motor vehicle—may therefore not be achieved if an abrupt torque jump is to be completely suppressed in shifting gears. In other words, after shifting, possibly more fuel is injected than absolutely necessary, even if the driver does not step on the gas pedal. To nevertheless brake the vehicle as desired, the driver would have to actuate the brake, which in turn increases its wear.

SUMMARY OF THE INVENTION

An object of the present invention is to refine a method in such a way that fuel consumption and, when used in a motor vehicle, brake wear are reduced. This object is achieved in a method by having the setpoint power output quantity, at least indirectly, be a function of the instantaneous transmission ratio of the transmission at least for a given intended power output. The above object is achieved accordingly in a computer program, an electric memory medium for a control and/or regulating device of an internal combustion engine, a control and/or regulating device for an internal combustion engine, and an internal combustion engine, in particular for a motor vehicle.

In the method according to the present invention, for a given intended power output, which in practice is usually a very low intended power output, the setpoint power output quantity is allowed to change on the basis of a change in the instantaneous transmission ratio. Although in these operating situations of the drive unit this may affect comfort, it is ensured that a minimum possible setpoint power output quantity is possible if this is desired by the user of the drive unit. When the engine is operated, energy is thus saved, and, when the drive unit is used in a motor vehicle, brake wear is also reduced.

It is first proposed that the dependence on the transmission ratio decrease continuously with increasing intended power output. Relatively great abrupt changes in the operating characteristics of the drive unit are thus prevented. In a motor vehicle in particular, operation is thus made easier.

In a concrete refinement, it is proposed that the dependence decrease linearly or exponentially. Linear dependence is easy to implement from the programming point of view. Exponential decrease of the dependence reliably makes operation possible for minimum intended power output even using the minimum possible power output quantity, yet provides significant improvement in comfort even for a slightly increased intended power output.

A particularly advantageous embodiment of the method according to the present invention is characterized in that the rate at which the instantaneous setpoint power output quantity changes during and/or after a change in the transmission ratio from the value corresponding to an earlier transmission ratio toward a target setpoint power output quantity corresponding to the later transmission ratio is limited at least from time to time (change limitation). Thus the comfort during operation of the drive unit is substantially improved even in operating situations in which the setpoint power output quantity greatly depends on the instantaneous transmission ratio of the transmission, since abrupt changes in the setpoint power output quantity are reduced or even fully eliminated whenever this is physically possible. Thus, in the method according to the present invention, the characteristics curve of the setpoint power output quantity plotted against the intended power output has no undesirable vertices (discontinuity of the slope), and the fuel metering behavior for a cold engine, which is strongly affected by friction, and a warm engine is almost identical. Fuel metering behavior is also essentially independent of the transmission ratio just set, and a possible brake torque of the drive unit is optimally utilized.

In a concrete refinement, it is proposed that the change limitation be effected by a filter, having a low-pass characteristic in particular. Such a filter is easy to implement from the programming point of view and, when the filter parameters are freely addressable, it allows the filter characteristics to be configured adapted to the instantaneous operating situation.

It is furthermore proposed that, if the instantaneous setpoint power output quantity corresponding to the earlier transmission ratio is less than a minimum possible power output quantity corresponding to the later transmission ratio, with the change in the transmission ratio the setpoint power output quantity is initially increased to an intermediate value at least approximately equal to the minimum possible power output quantity corresponding to the later transmission ratio without change limitation, and then the instantaneous setpoint power output quantity is increased from the intermediate value to the later target setpoint power output quantity using change limitation. In this method variant, an abrupt change in the setpoint power output quantity is thus permitted in certain operating situations of the drive unit. However, the amount of the jump is limited to the physically required amount. The difference between the intermediate value and the target setpoint power output quantity corresponding to the later transmission ratio is then bridged at a limited rate of change. The above-named measures, which may occasionally reduce comfort, are thus restricted to the minimum amount absolutely required for achieving the fuel savings possible according to the present invention.

It is also particularly advantageous if the change limitation of the instantaneous setpoint power output quantity is set in such a way that the instantaneous setpoint power output quantity changes essentially like the intended power output when the intended power output changes, whereas it is subjected to the change limitation when the transmission ratio changes. This is based on the fact that the instantaneous setpoint power output quantity also varies according to the instantaneous intended power output. According to the present invention, in the case of highly dynamic intended power output, a similarly highly dynamic instantaneous setpoint power output quantity is also allowed by reducing the change limitation of the instantaneous setpoint power output quantity in the event of highly dynamic intended power output compared to an operating situation having a less dynamic intended power output, regardless of a possible change in the transmission ratio. The comfort during operation of the drive unit is thus ensured in the event of a change in the transmission ratio when the intended power output remains constant or changes only slowly, while in the event of a highly dynamic intended power output, for example, in the case of abrupt pressing or abrupt release of the gas pedal, the expressed intended power output may be spontaneously implemented.

It is particularly advantageous if the rate of change in the instantaneous setpoint power output quantity is at least approximately equal to the rate of change in the intended power output; then the intended power output is prioritized regarding the formation of the setpoint power output quantity in every operating situation, regardless of a change in the transmission ratio.

An advantageous possibility of implementing the method according to the present invention is that the instantaneous setpoint power output quantity is additively formed at least from a first component and a second component, the intended power output being taken into account to a higher degree in the first component than in the second component, the minimum possible power output quantity being taken into account to a higher degree in the second component than in the first component, and the change limitation of the first component being less than that of the second component. This is an option that is easy to program and allows the instantaneous setpoint power output quantity to follow a change in the intended power output relatively spontaneously, yet with a change in the transmission ratio an abrupt change in the instantaneous setpoint power output quantity is reduced or even completely prevented.

In a particularly advantageous embodiment of the method according to the present invention, in particular when the drive unit is used in a motor vehicle, if the intended power output is at least approximately equal to the minimum and/or there is an explicit reduction or deactivation request, expressed in particular by the operation of the brake, the change limitation is reduced and preferably deactivated. This ensures that a minimum intended power output or an intended braking is basically implemented to the maximum. A particularly significant fuel savings is thus achieved.

Basically, the minimum possible power output quantity of a typical engine increases with its speed due to the increasing internal friction. To prevent the change limitation in the case of dynamic and continuous changes in the rotational speed from resulting in an undesirable deviation of the instantaneous setpoint power output quantity from the essentially intended target setpoint power output quantity, it is proposed that the change limitation be reduced or deactivated outside a limited time range after and possibly before a change in the transmission ratio. Or, in other words, the change limitation or filtering is activated only around the time of shifting.

DETAILED DESCRIPTION

Figure 1:
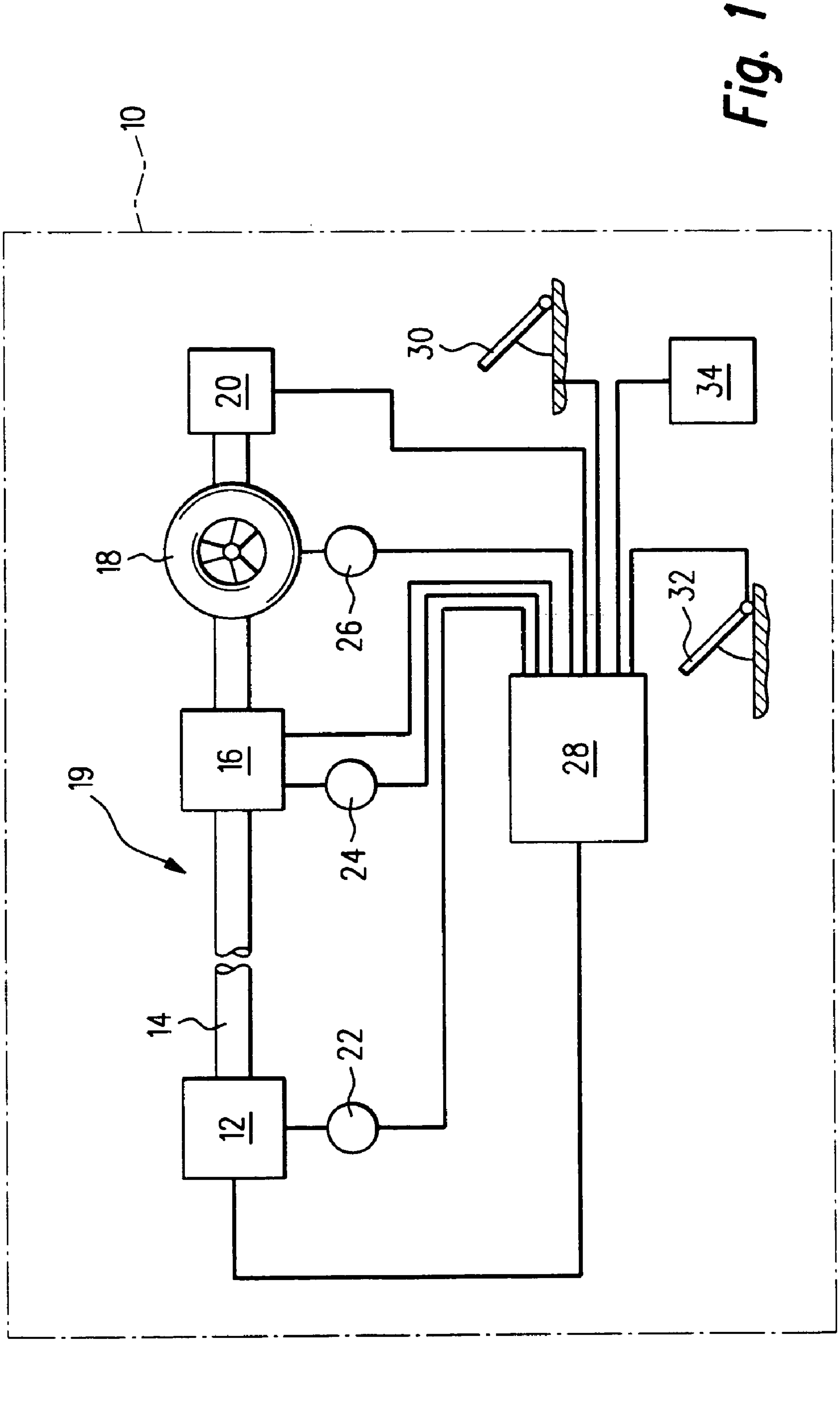
FIG. 1 schematically shows a motor vehicle having a drive unit which includes an engine and a transmission.

A motor vehicle is identified overall in FIG. 1 with the reference symbol 10. It includes an engine designed as an internal combustion engine 12, which sets a crankshaft 14 in rotary motion. It is connected to a transmission 16, which drives wheels 18 of motor vehicle 10, only one of which is illustrated. Engine and transmission are parts of a drive unit 19. A brake 20 also acts upon wheels 18.

Various instantaneous operating parameters of engine 12 are picked up by a sensor 22 illustrated as an example. These include, for example, an instantaneous operating temperature of the engine. Transmission 16 is an automatic multistage transmission, i.e., the transmission ratios of one gear differ from those of another gear (this is included here, as is a continuously variable transmission, not shown, under the term "variable transmission ratio"). The instantaneous gear is detected by a transmission sensor 24. The driving velocity is picked up at wheel 18 via velocity sensor 26.

The operation of motor vehicle 10 and drive unit 19 is controlled and/or regulated by control and regulating unit 28. It includes a plurality of memory media on which computer programs for control and regulation of motor vehicle 10 are stored. Control and regulating unit 28 receives input signals from sensors 22, 24, and 26, among others. Furthermore, the positions of a gas pedal 30 and a brake pedal 32 are transmitted to control and regulating unit 28. The input signals of a cruise control unit 34 are also transmitted to control and regulating unit 28. It in turn controls engine 12, transmission 16, and brake 20.

A certain intended power output is expressed by a corresponding operation of gas pedal 30 or a certain signal of cruise control unit 34. If gas pedal 30 is not being operated, an intended power output of 0% is assumed; if gas pedal 30 is fully depressed, an intended power output of 100% is assumed. An internal torque, corresponding to the mean grass forces applied to the pistons of engine 12, converted to torque, is assumed. The "clutch torque" results from this internal torque after deduction of torque losses (friction, load change, auxiliary units).

The minimum internal torque may be obtained from the control algorithm of an idling control, for example. At high rotational speeds, the minimum internal torque tends to zero; with decreasing rotational speed it increases and, if the idling control is properly configured, it is exactly equal to the torque loss when the rotational speed of engine 12 is equal to the idling setpoint speed.

Assuming an operating situation in which the intended power output expressed by gas pedal 30 is 0% and in which vehicle 10 accelerates at the same time (for example, on a downward-sloping stretch), this means that engine 12 is "dragged" by vehicle 10. Combustion must therefore generate a lower torque than that "consumed" by engine 12 due to friction and the auxiliary units. The result is that engine 12 generates a negative output torque on wheels 18, i.e., a braking torque. This braking torque is illustrated in FIG. 2 plotted against the velocity of vehicle 10 as curve 36 and is also known as the minimum possible output torque.

Figure 2:
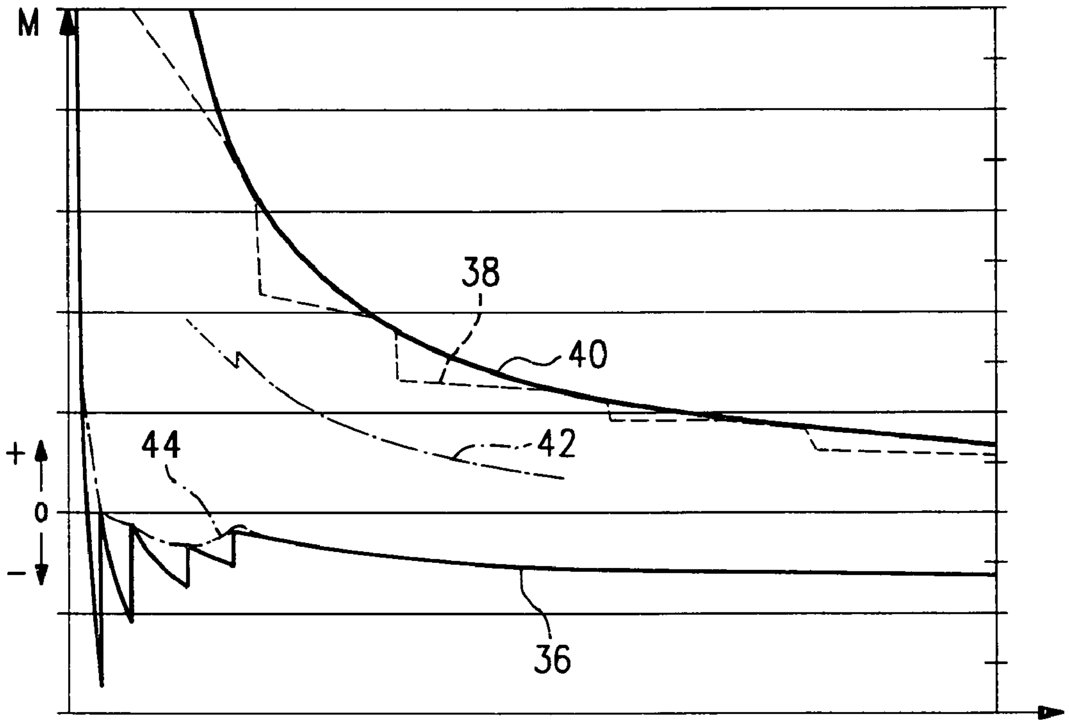
FIG. 2 shows a diagram in which output torques as minimum and maximum possible power output quantities of the drive unit of FIG. 1 are plotted against the velocity of the motor vehicle.

FIG. 2 shows that curve 36 has V jumps at certain velocities. These arise due to the fact that shifting points of transmission 16 are assumed here. The exact shifting points of transmission 16 may vary between a shift from a lower gear to a higher gear and vice versa due to hysteresis. Due to a shifting operation, the rotational speed of crankshaft 14 of engine 12 changes at constant velocity of vehicle 10, whereby the minimum possible output torque also changes when transmission 16 is shifted. Another curve 38 in FIG. 2 describes the maximum possible output torque at full load of engine 12 and maximum rotation of the gears up to the particular maximum speed.

For controlling and/or regulating the output torque to be generated by engine 12, setpoint values are formed, which, for the sake of simplicity, are hereinafter referred to as "setpoint torques." The actual setpoint value is referred to as "instantaneous setpoint torque." This is to correspond to a "target setpoint torque" as exactly as possible and is possibly even equal thereto. For an intended power output of 100%, the target setpoint torque corresponds to an envelope, which is formed by the vertices of maximum possible output torque 38. This envelope is labeled 40 in FIG. 2.

For an intended power output of 0%, the target setpoint torque corresponds to minimum possible output torque 36. For an intended power output greater than 0%, in this exemplary embodiment the target setpoint torque is linearly scaled between minimum possible output torque 36 and envelope 40. In an exemplary embodiment not illustrated, scaling is exponential. Consequently, for an intended power output of 50%, a target setpoint torque as illustrated in FIG. 2 only for a limited velocity range for the sake of simplicity as dash-point curve 42 is obtained. It is evident that the jumps of target setpoint torque 42 occurring in the event of a gear shift are smaller for a high intended power output than for a low intended power output, or, in other words: the dependence of the target setpoint torque, or of the instantaneous setpoint torque dependent on it, on the transmission ratio decreases with increasing intended power output.

As explained above, the power output of the engine is set on the basis of the instantaneous setpoint torque, which in turn is to correspond to the target setpoint torque. If the target setpoint torque changes abruptly in the event of a gear shift, an acceleration jolt of vehicle 10, which could negatively affect comfort, may occur. Full smoothing of the target setpoint torque, which might prevent an acceleration jolt of this type when operating vehicle 10, would, however, have the disadvantage that, in particular in the event of an intended power output of 0%, curve 36 of the minimum possible output torque could be achieved only in some areas (see curve 44 in FIG. 2), which could result in an excessive output torque being requested from engine 12 for an intended power output of 0%, i.e., fuel would be wasted. To compensate for this, the user would have to operate brake pedal 32 in such an operating situation, which would result in undesirable wear of brake 20.

Therefore, in an exemplary embodiment not illustrated, in the range of an intended power output from 0% to 15%, the target setpoint torque, i.e., the instantaneous setpoint torque which is identical thereto, is directly scaled between the minimum and maximum possible output torques (curves 36 and 40 in FIG. 2); i.e., abrupt torque changes are permitted in the event of a gear shift. Above an intended power output of 15%, for a given velocity of vehicle 10, a target setpoint torque or instantaneous setpoint torque is defined which is independent of the selected gear of transmission 16 and involves no abrupt torque changes.

An alternative thereto is a method which is now elucidated in more detail on the basis of FIGS. 3 through 12. In this method, the target setpoint torque is obtained by the linear scaling of FIG. 2 corresponding to curve 42 in the entire range of intended power output from 0% to 100%. An instantaneous setpoint torque is adjusted to the target setpoint torque in a predefined manner which is elucidated in detail below.

It must be kept in mind that, when the method is implemented as a computer program, no explicit determination of the target setpoint torque and no "adjustment" of the instantaneous setpoint torque in the sense of control technology is required. The target setpoint torque may actually only be a "virtual" value which should normally be equal to the instantaneous setpoint torque.

Figure 3:
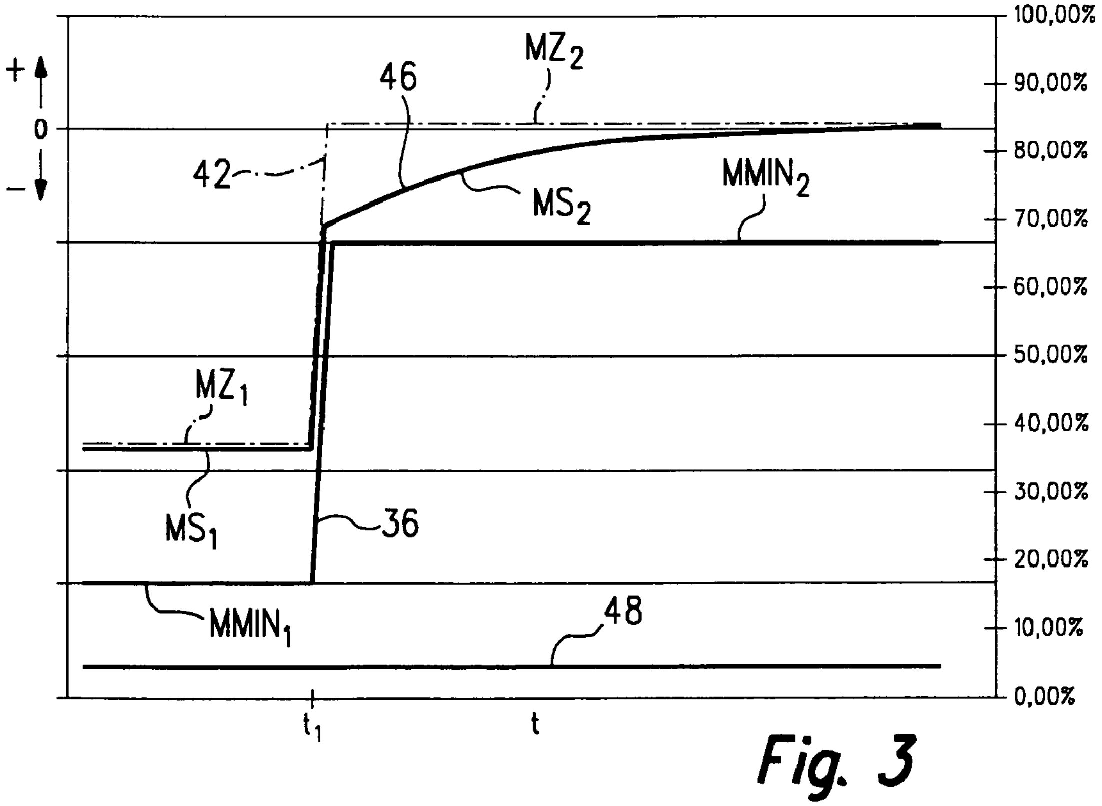
FIG. 3 shows a diagram in which the minimum possible output torque, an instantaneous setpoint output torque, and a target setpoint output torque are plotted against time in the case of a change in the transmission ratio.

FIG. 3 shows an operating situation of vehicle 10, in which the intended power output (curve 48, right-hand scale) is constant at 5%, and in which transmission 16 shifts from a lower to a higher gear at time $t_1$. The curve of the minimum possible output torque is again labeled with the reference symbol 36, and that of the linearly scaled target setpoint torque corresponding to the intended power output with reference symbol 42. The curve of the instantaneous setpoint torque is labeled with the reference symbol 46.

It is evident that the value $MZ_1$ of target setpoint torque 42 before the gear shift at time $t_1$ is identical to the value $MS_1$ of instantaneous setpoint torque 46, and both values are less than the value $MMIN_2$ of minimum possible output torque 36 after the gear shift. In this case, in the event of a gear shift at time $t_1$, instantaneous setpoint torque 46 increases abruptly to the value $MMIN_2$. Subsequently, gradually and asymptotically, it is brought to the value $MZ_2$ of target setpoint torque 42 prevailing after the gear shift. This is accomplished using a filter having a low-pass characteristic. This means that the filter limits, at least from time to time, the rate at which instantaneous setpoint torque 46 changes from earlier value $MS_1$ to a later value $MZ_2$ in the event of a change in the transmission ratio of transmission 16. This is referred to briefly as "change limitation."

Figure 4:
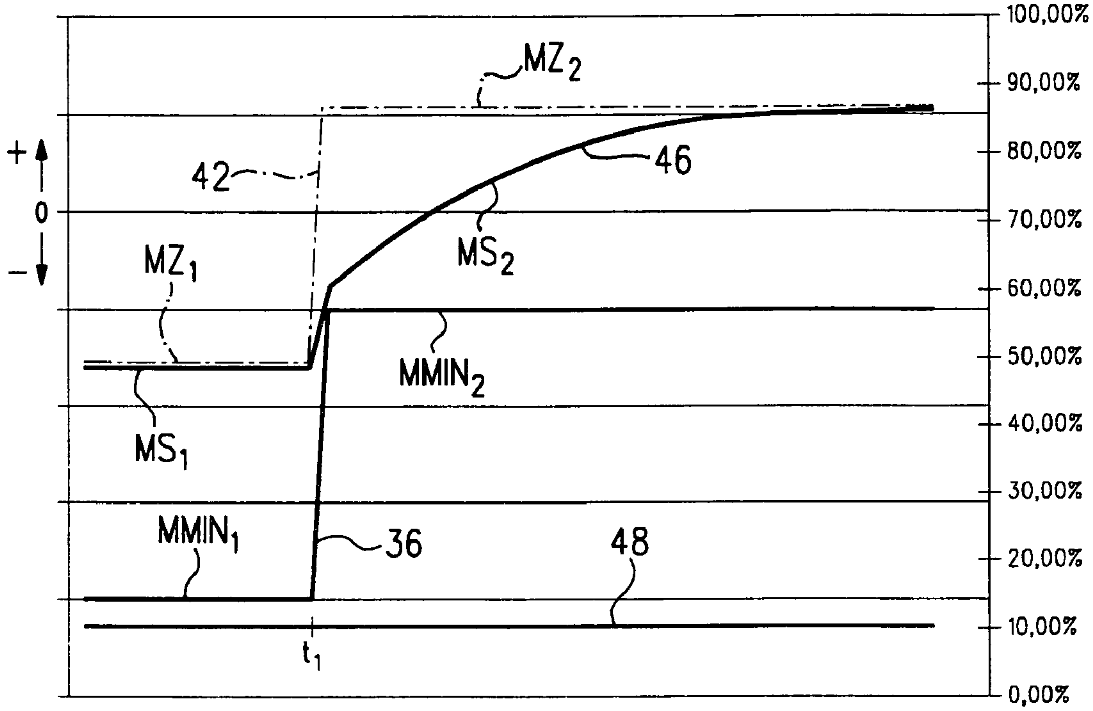
FIG. 4 shows a diagram similar to that of FIG. 3 having a different initial value of the instantaneous and target setpoint output torques.

FIG. 4 shows a similar case, but for a higher intended power output of 10%. In this case, target setpoint torque 42 and instantaneous setpoint torque 46 before the gear shift at time $t_1$ have an identical value $MZ_1$ and $MS_1$, respectively, which is only slightly less than the value $MMIN_2$ of minimum possible output torque 36 after the gear shift. The abrupt change in curve 46 of the instantaneous setpoint torque therefore turns out to be very small, and most of the increase in instantaneous setpoint torque 46 to value $MZ_2$ of the target setpoint torque occurs asymptotically at a limited rate predefined by the characteristic of the filter.

Figure 5:
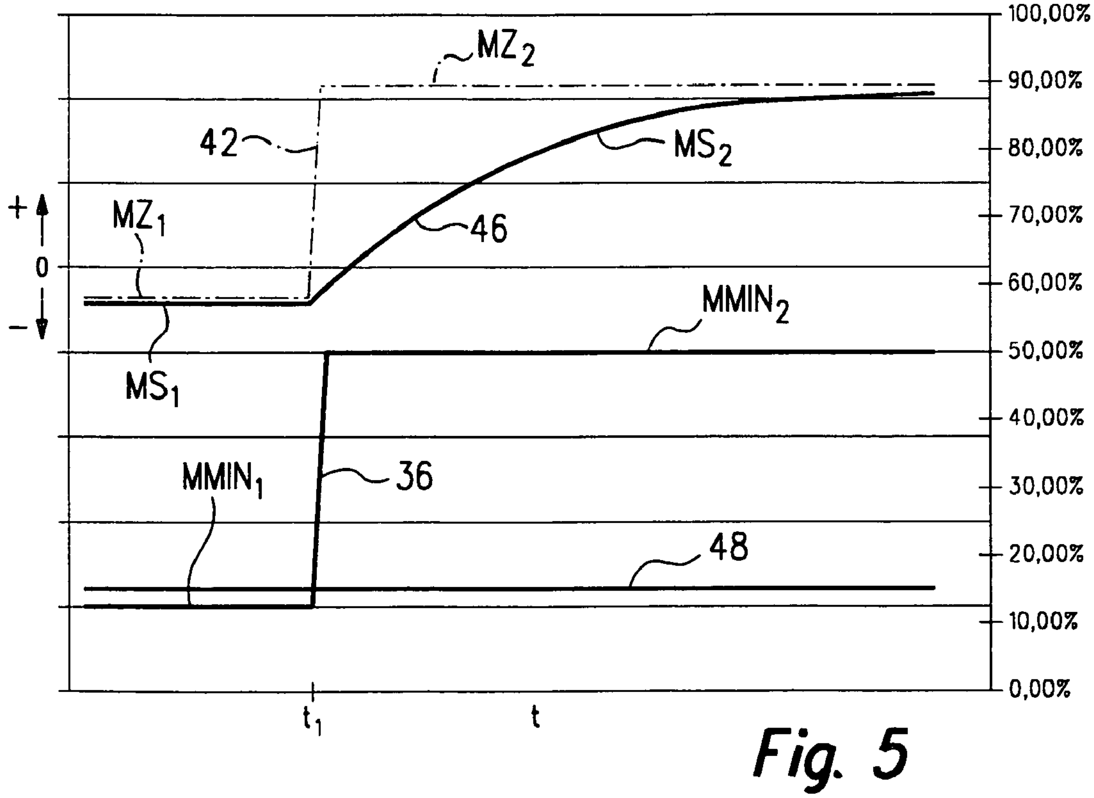
FIG. 5 shows a diagram similar to that of FIG. 3 having another different initial value of the instantaneous and target setpoint output torques.

Another different operating situation of vehicle 10 featuring an even higher intended power output 48 of 15% is shown in FIG. 5. For such an intended power output, the values of instantaneous setpoint torque 46 and target setpoint torque 42, $MS_1$ and $MZ_1$, respectively, before the gear shift at time $t_1$ are higher than the value $MMIN_2$ of minimum possible output torque 36 after the gear shift. Thus, no abrupt change in instantaneous setpoint torque 46 takes place at time $t_1$ of the gear shift. Instead, instantaneous setpoint torque 46 after the gear shift is "adjusted" fully asymptotically to new value $MZ_2$ of target setpoint torque 42. FIGS. 3 through 5 show that instantaneous setpoint torque 46 at very low intended power outputs in the event of a gear shift is highly affected by the abrupt change in minimum possible output torque 36. Such an abrupt change, however, is reduced or even fully eliminated even at somewhat higher intended power outputs 48.

Figure 6:
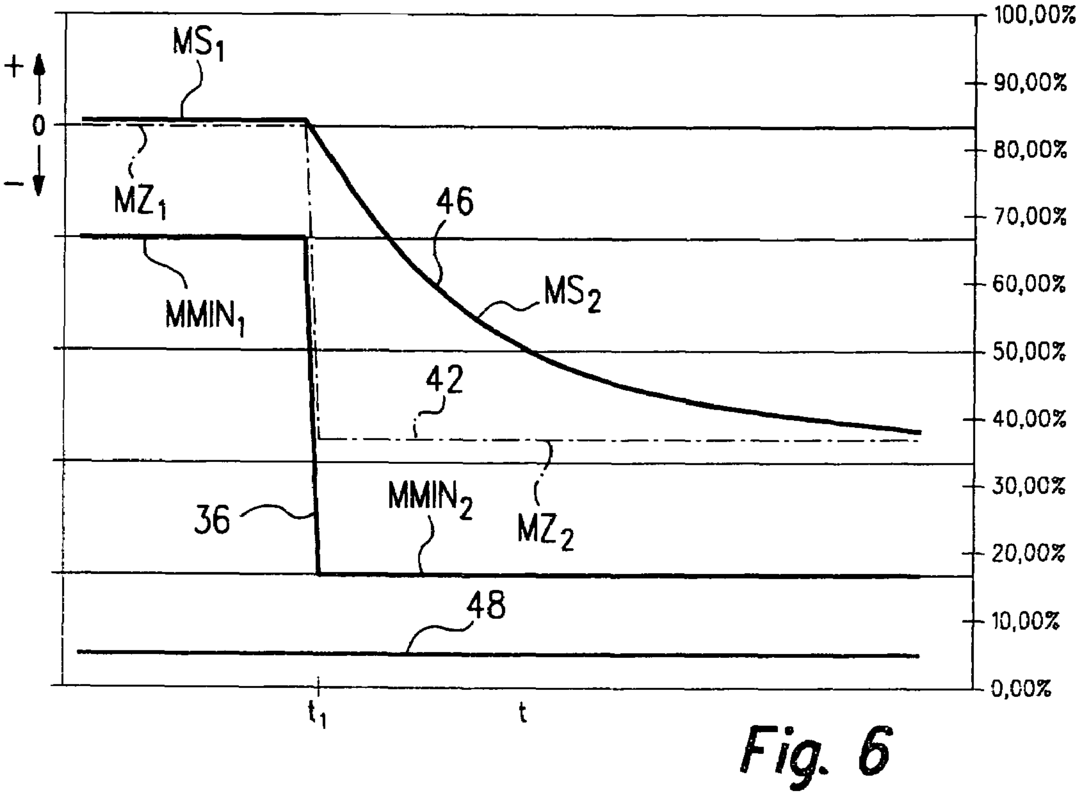
FIG. 6 shows a diagram similar to that of FIG. 3 in the case of another change in the transmission ratio.

FIG. 6 shows the case of a gear shift from a higher gear to a lower gear at a constant intended power output 48 of 5%. Before the gear shift at time $t_1$, both curves 42 and 46 of the target setpoint torque and the instantaneous setpoint torque have identical values $MZ_1$ and $MS_1$, respectively, which are somewhat higher than value $MMIN_1$ of minimum possible output torque 36. At the time of the gear shift, target setpoint torque 42 drops abruptly to the new value $MZ_2$. In contrast, the instantaneous setpoint torque corresponding to curve 46 approaches value $MZ_2$ of target setpoint torque 42 asymptotically due to the filtering.

Figure 7:
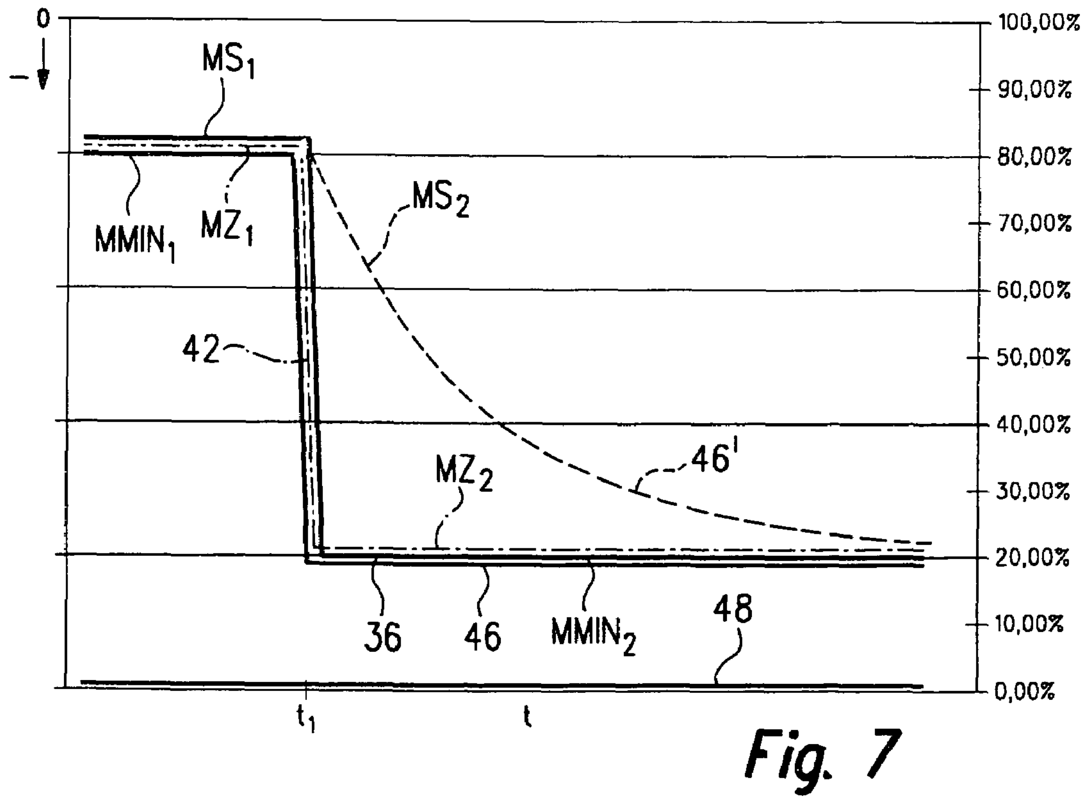
FIG. 7 shows a diagram similar to that of FIG. 6 having a different initial value of the instantaneous and target setpoint output torques.

FIG. 7 shows a similar case, in which, however, the intended power output is constant at 0% (i.e., gas pedal 30 is not being operated, and cruise control 34 is off). In such an operating case, the curve of target setpoint torque 42 is identical to that of minimum possible setpoint torque 36. Instantaneous setpoint torque 46 before the gear shift at time $t_1$ is also identical to minimum possible setpoint torque 36, filtered after the gear shift, it would asymptotically approach the new value $MZ_2$ of target setpoint torque 42 (dashed curve 46'). This is advantageous from the point of view of comfort; however, it results in engine 12 generating a higher output torque immediately after a shift from a higher gear to a lower gear than corresponds to the power output of 0% intended by the user of vehicle 10.

Therefore in those cases where intended power output 48 is 0%, the limitation of the rate of change of instantaneous setpoint torque 46 by filtering (change limitation) is deactivated. This results in instantaneous setpoint torque 46 being equal to target setpoint torque 42 (solid curve 46) in these cases. The filtered "adjustment" of instantaneous setpoint torque 46 to target setpoint torque 42 is also deactivated when brake pedal 42 is operated.

Figure 8:
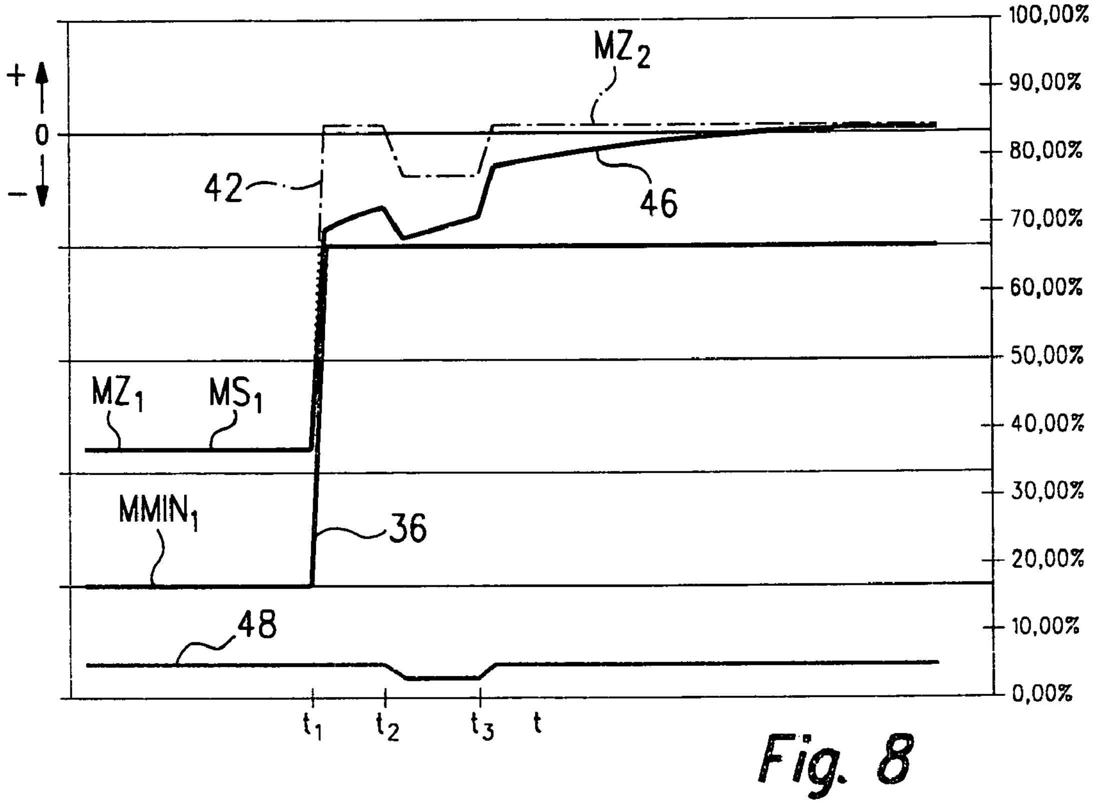
FIG. 8 shows a diagram similar to that of FIG. 3 having a different curve of the target setpoint output torque.

FIG. 8 shows an operating situation of vehicle 10, in which, shortly after the gear shift from a lower gear to a higher gear at time $t_1$, intended power output 48 is somewhat reduced at time $t_2$ and increased again to its original value at time $t_3$. It is apparent that, as in the operating situations explained in the previous diagrams, instantaneous setpoint torque 46 is "adjusted" asymptotically to value $MZ_2$ of target setpoint torque 42 after the gear shift.

However, it is also apparent that at time $t_2$ instantaneous setpoint torque 46 responds without delay to reduced intended power output 48 and responds, at time $t_3$, also without delay, to intended power output 48 that has been increased again by the user. This is made possible by forming instantaneous setpoint torque 46 from two additive components. The first component is not filtered, and essentially it is only a function of intended power output 48. The second component is subject to the change limitation, i.e., filtering, and takes into account, among other things, minimum possible output torque 36 which changes abruptly in the event of a gear shift. The additive components are elucidated in more detail further below.

Figure 9:
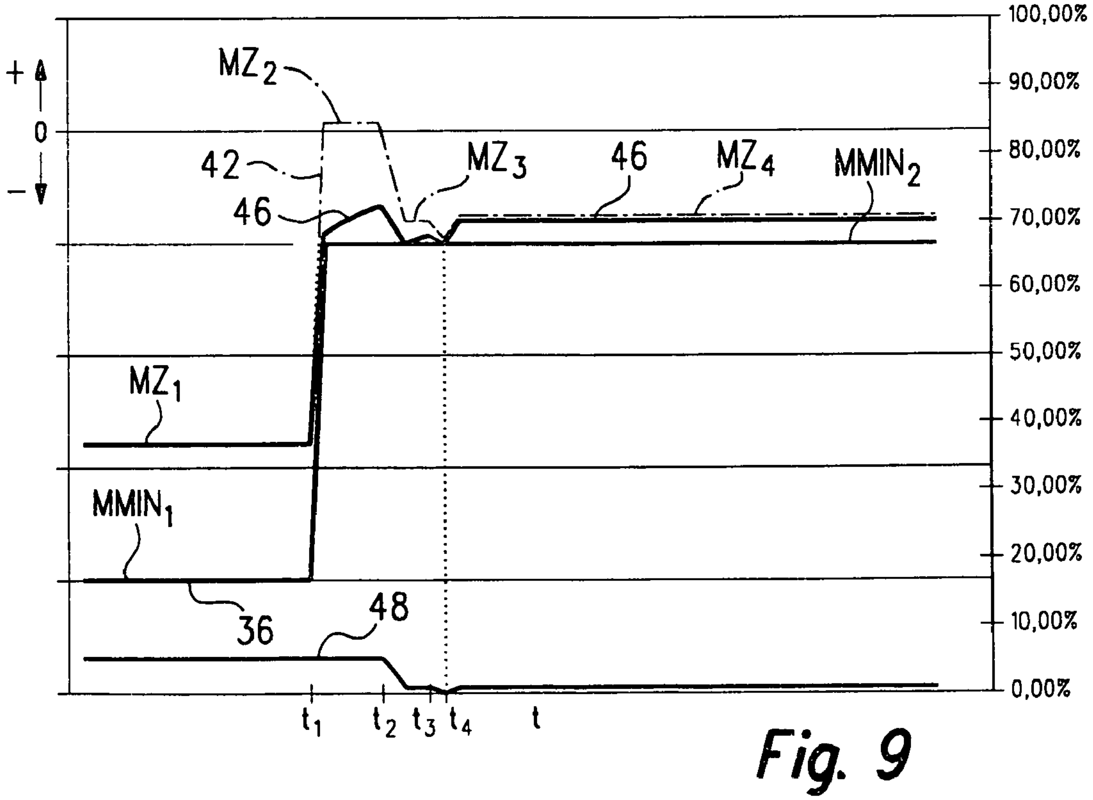
FIG. 9 shows a diagram similar to that of FIG. 8 having another different curve of the target setpoint output torque.

FIG. 9 shows a similar situation to that illustrated in FIG. 8, in which intended power output 48 is reduced at time $t_2$ more than in FIG. 8 to approximately 2% to 3%. Therefore, instantaneous setpoint torque 46, which was still increasing after the gear shift, drops abruptly to minimum possible output torque 36, which has the value $MMIN_2$ after the gear shift. When intended power output 48 is reduced, this results in a certain "idle motion," in which instantaneous setpoint torque 46 is therefore not further reduced despite the cancellation of intended power output 48, because it is limited by value $MMIN_2$ of minimum possible output torque 36.

At time $t_3$, the intended power output is reduced to 0%. Target setpoint torque 42 also drops accordingly to the value $MMIN_2$ of minimum possible setpoint torque 36. Instantaneous setpoint torque 46 also drops to this value. At time $t_4$ the intended power output is raised again from 0% to approximately 2%. Target setpoint torque 42 increases accordingly to a value $MZ_4$. As explained in connection with FIG. 8, an increase in intended power output 48 is immediately implemented. Therefore at time $t_4$ instantaneous setpoint torque 46 also increases again. Since at time $t_4$ instantaneous setpoint torque 46 and target setpoint torque 42 have identical values, namely the value $MMIN_2$ of minimum possible output torque 36, after time $t_4$ instantaneous setpoint torque 46 no longer approaches target setpoint torque 42 asymptotically. Therefore, both curves 42 and 46 have an identical shape.

Figure 10:
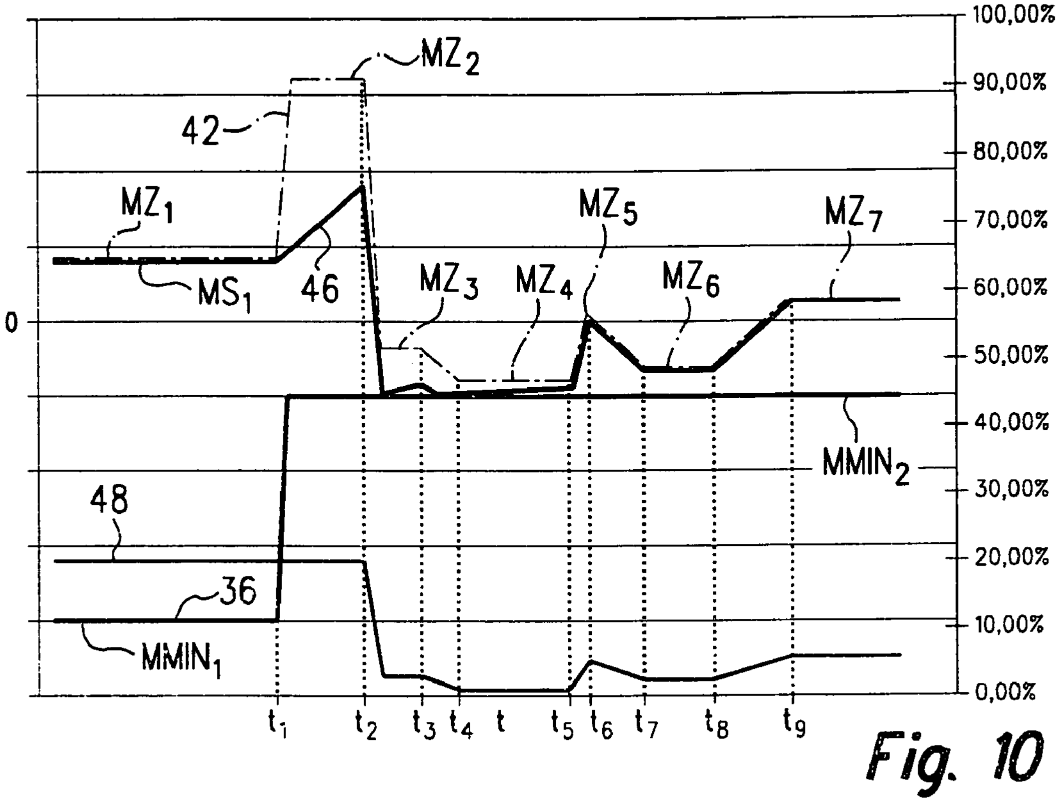
FIG. 10 shows a diagram similar to that of FIG. 8 having another different curve of the target setpoint output torque.

FIG. 10 shows another, more complex operating situation of vehicle 10 than in FIG. 9. At a constant intended power output of 20%, a shift from a lower gear to a higher gear is performed at time $t_1$. Target setpoint torque 42 therefore increases from a value $MZ_1$ to a value $MZ_2$. Instantaneous setpoint torque 46 is increased by the filter asymptotically toward the new target value $MZ_2$ starting at time $t_1$. While instantaneous setpoint torque 46 is still increasing, the intended power output is abruptly reduced to 3% at time $t_2$. Similarly, target setpoint torque 42 drops to the new value $MZ_3$. Instantaneous setpoint torque 46 also drops accordingly; however, its minimum value is limited by minimum possible output torque 36, which has the value $MMIN_2$ after the gear shift.

Times $t_3$ through $t_9$ denote further vertices of curve 48, which reproduces the variation of the intended power output over time, the expressed intended power output always being more than 0%. It is apparent that changes in intended power output 48 immediately result in a corresponding change in instantaneous setpoint torque 46, and instantaneous setpoint torque 46 more and more approaches target setpoint torque 42 independently of the changes in intended power output 48.

In the operating situations which were explained in previous FIGS. 3 through 10, the simplified assumption was made that the velocity of vehicle 10 is approximately constant in the time period in question. Curve 36 of the minimum possible output torque changed in this case only when changing gears at particular time $t_1$. However, as is evident from FIG. 2, minimum possible output torque 36 is a function not only of the instantaneous transmission ratio, i.e., the instantaneous gear of transmission 16, but also of the rotational speed of crankshaft 14, i.e., the velocity of vehicle 10. This, however, is a continuous function without discontinuities. This effect is also taken into account in the diagram of FIG. 11.

Figure 11:
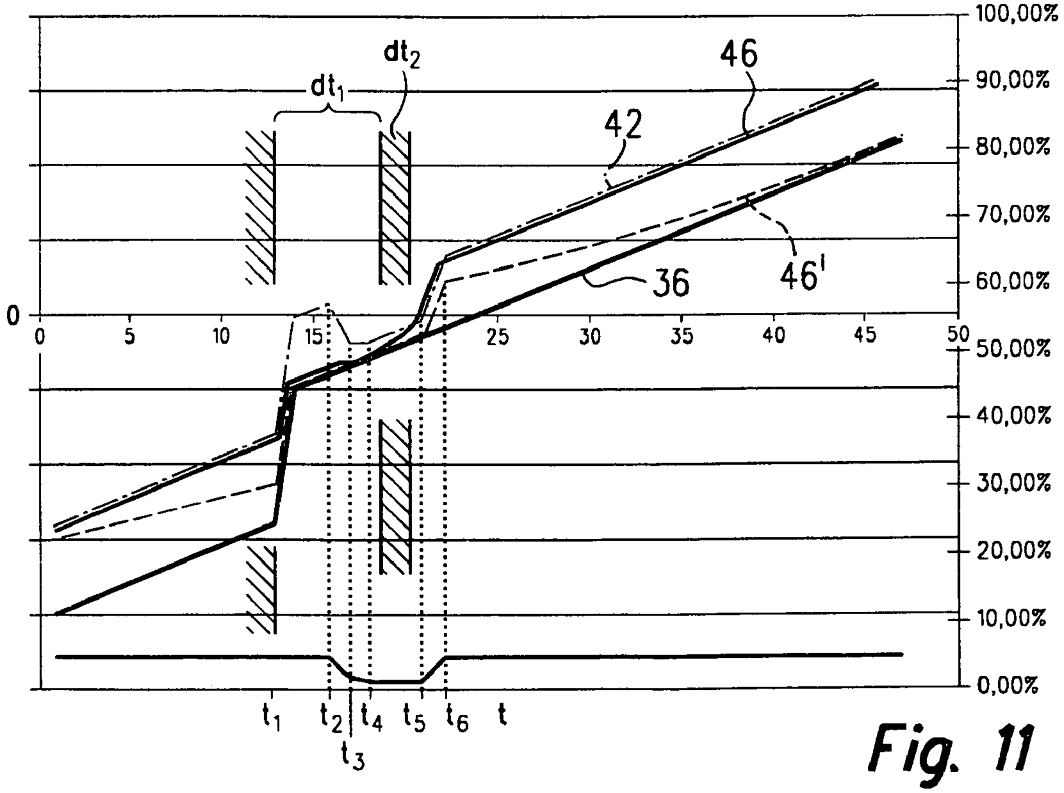
FIG. 11 shows a diagram similar to that of FIG. 8 for increasing velocity of the motor vehicle.

FIG. 11 shows an operating situation of vehicle 10, in which vehicle 10 becomes uniformly slower at a constant intended power output 48, and in which at time $t_1$ a manual gear shift is performed from a lower gear to a higher gear. The basic sequences occur in the same way, however, also in the case of increasing velocity, for example. Times $t_2$ through $t_6$ again denote vertices of curve 48, which reproduces the intended power output. A curve 46' drawn in dashed lines describes an instantaneous setpoint torque 46, which would result if filtering, i.e., change limitation, were always active.

It is shown that filtering, i.e., change limitation of instantaneous setpoint torque 46, is active also in the case of a continuous change in minimum possible output torque 36 due to a change in velocity and results in curve 46' not approaching curve 42 of the target setpoint torque but rather moving away from it. For this reason, filtering, i.e., change limitation, is activated in the event of a gear shift at time $t_1$, but only remains active during a period $dt_1$. After this period, the time constant of the filter is brought to the value 1 during a transition phase $dt_2$, which corresponds to a gradual deactivation of the filter. During this transition period $dt_2$, instantaneous setpoint torque 46, represented by a solid line, approaches curve 42 of the target setpoint torque and, by the end of transition period $dt_2$ is identical thereto.

A concrete algorithm for determining the instantaneous setpoint torque according to curve 46 in FIG. 11 is described below.

A maximum possible output torque corresponding to curve 40 in FIG. 2 is obtained from the following formula:

$$MMAX = c*P\_max/v \tag{1}$$

P_max is the maximum deliverable power output of the engine at nominal speed. It may be computed according to the following formula, for example:

$$P\_max = P\_int\_max - P\_loss(n\_nom) \tag{2}$$

The term P_int_max is the maximum internal torque of engine 12; the term mdloss is the torque loss which is a function of nominal speed n_nom of engine 12. n_nom in turn is the rotational speed at which engine 12 delivers its maximum power output. Power loss P_loss is computed using the following formula:

$$P\_loss = P\_fric + P\_aux + P\_pump \tag{3}$$

The term P_fric takes into account the friction power loss of engine 12 and load change losses. P_aux takes into account the power required by auxiliary units of engine 12; P_pump takes into account the required power due to pump losses (therefore, at full load P_pump is normally approximately equal to zero).

Minimum possible output torque MMIN corresponding to curve 36 in FIG. 11 is computed from the following formula:

$$MMIN = i*(mimin - P\_loss/n) \tag{4}$$

Factor i takes into account the instantaneous transmission ratio of transmission 16, i.e., the instantaneous gear. The term mimin represents the minimum internal torque of engine 12, as explained in detail above. The friction torque used in formula (4), however, does not refer to the nominal rotational speed, but to instantaneous speed n of crankshaft 14 of engine 12. The term mpump takes into account pump losses which are a function of the pressure differential between the pressure in the intake pipe and that in the exhaust pipe. The term M_Neben takes into account torque losses due to auxiliary units.

Instantaneous setpoint torque 46 may be computed from two additive terms using the following formula:

$$MS = mrped*M\_stroke + M\_ped \tag{5}$$

The term mrped corresponds to the intended power output according to curve 48 in the diagrams of FIGS. 3 through 11. If the gas pedal is not being operated, it is zero; if the gas pedal is fully depressed, it is 100%. As explained repeatedly above, any scaling may be performed between those two values to obtain a desired characteristic. The term M_stroke may be computed as follows:

$$M\_stroke = MMAX - MMIN \tag{6}$$

The second additive term M_ped in formula (5) may be computed as follows:

$$M\_ped = a*MMIN + (1-a)*(M\_ped\_old + M\_ped\text{-}corr\_1 + M\_ped\_corr\_2) \tag{7}$$

where $$M\_ped\_corr\_1 = mrped*(MMIN - MMIN\_old) \tag{8}$$

$$M\_ped\_corr\_2 = MAX(MMIN - (mrped*M\_stroke + M\_ped\_old + M\_ped\_corr\_1);0) \tag{(9)}$$

The additive term M_ped in formula (5) represents instantaneous setpoint torque 46 for an intended power output of 0%. It is formed taking into account a factor a, which results in an infinite filter constant if it has the value zero, and in a deactivated filter if it has the value 1. The terms M_ped_corr are dynamic correcting quantities which are responsible for preventing, to the degree possible, an abrupt change in instantaneous setpoint torque MS when minimum possible output torque MMIN abruptly changes. These quantities are obtained purely algebraically both from the requirement of a constant setpoint torque MS and from the requirement that instantaneous setpoint torque MS approach the target setpoint torque represented by curve 42 in FIGS. 3 through 11. The terms MMin_old and M_ped_old denote values of the previous computation cycle.

What is claimed is:

1. A method for operating a drive unit that includes an engine and a transmission having a variable transmission ratio, comprising:

determining an intended power output based on a gas pedal operation;

determining an instantaneous setpoint power output quantity of the drive unit from the intended power output, maximal possible output torque of an engine at nominal speed, and minimal possible output torque of an engine at an instantaneous speed, wherein the setpoint power output quantity is a function of an instantaneous transmission ratio of the transmission, at least for a given intended power output; and for a change limitation, reducing, at least intermittently, a rate at which the instantaneous setpoint power output quantity approaches a target setpoint power output quantity corresponding to a later transmission ratio, the reducing occurring at least one of during and after a change limitation period corresponding to a change in the instantaneous transmission ratio from an earlier transmission ratio to the later transmission ratio;

wherein:

if the instantaneous setpoint power output quantity corresponding to the earlier transmission ratio is less than a minimum possible power output quantity corresponding to the later transmission ratio, then, with the change in the transmission ratio, the instantaneous setpoint power output quantity is initially increased, without reducing the rate at which the instantaneous setpoint power output quantity approaches the target setpoint power output quantity, until the instantaneous setpoint power output quantity reaches an intermediate value at least approximately equal to the minimum possible power output quantity corresponding to the later transmission ratio, at which point reduction of the rate at which the instantaneous setpoint power output quantity approaches the target setpoint power output quantity is activated;

the change limitation is activated in an event of a gear shift at a first predetermined time, the change limitation remaining active until a second predetermined time; and subsequent to the second predetermined time, a time constant of the change limitation is brought to a value of 1, so that the instantaneous power output quantity approaches the target setpoint power output quantity at a third predetermined time.

2. The method as recited in claim 1, wherein a dependence on the instantaneous transmission ratio decreases continuously with increasing intended power output.

3. The method as recited in claim 2, wherein the dependence decreases one of linearly and exponentially.

4. The method as recited in claim 1, wherein an extent of the reducing of the rate at which the instantaneous setpoint power output quantity approaches the target setpoint power output quantity is effected by a filter having a low-pass characteristic.

5. The method as recited claim 1, wherein the reducing of the rate at which the instantaneous setpoint power output quantity approaches the target setpoint power output quantity is set in such a way that the instantaneous setpoint power output quantity changes like the intended power output when the intended power output changes, whereas the instantaneous setpoint power output quantity is subjected to the rate reducing when the instantaneous transmission ratio changes.

6. The method as recited in claim 1, wherein, when the instantaneous setpoint power output quantity is initially increased without reducing the rate at which the instantaneous setpoint power output quantity approaches the target setpoint power output quantity, the rate of approach of the instantaneous setpoint power output quantity is at least approximately equal to a rate of change of the intended power output.

7. The method as recited in claim 1, wherein:

the instantaneous setpoint power output quantity is formed at least from a first component and a second component, the intended power output being taken into account to a higher degree in the first component than in the second component, the minimum possible power output quantity being taken into account to a higher degree in the second component than in the first component, and an extent of the reducing of the rate at which the instantaneous setpoint power output quantity approaches the target setpoint power output quantity is lesser for the first component than for the second component.

8. The method as recited in claim 1, wherein: if at least one of (a) the intended power output is at least approximately equal to a minimum intended power output and (b) there is one of an explicit reduction in the intended power output and a deactivation request, expressed by an operation of a brake by a user, the change limitation is reduced and deactivated.

9. The method as recited in claim 1, wherein: the change limitation is one of reduced and deactivated, when outside a limited time range after the change in the instantaneous transmission ratio.

10. A hardware computer-readable medium having stored thereon instructions executable by a computer processor, the instructions which, when executed, cause the processor to perform a method for a control and/or regulating device of an internal combustion engine, the method comprising:

determining an intended power output based on a gas pedal operation;

determining an instantaneous setpoint power output quantity of a drive unit from the intended power output, maximal possible output torque of an engine at nominal speed, and minimal possible output torque of an engine at an instantaneous speed, wherein the setpoint power output quantity is a function of an instantaneous transmission ratio of a transmission, at least for a given intended power output; and for a change limitation, reducing, at least intermittently, a rate at which the instantaneous setpoint power output quantity approaches a target setpoint power output quantity corresponding to a later transmission ratio, the reducing occurring at least one of during and after a change limitation period corresponding to a change in the instantaneous transmission ratio from an earlier transmission ratio to the later transmission ratio;

wherein:

if the instantaneous setpoint power output quantity corresponding to the earlier transmission ratio is less than a minimum possible power output quantity corresponding to the later transmission ratio, then, with the change in the transmission ratio, the instantaneous setpoint power output quantity is initially increased, without reducing the rate at which the instantaneous setpoint power output quantity approaches the target setpoint power output quantity, until the instantaneous setpoint power output quantity reaches an intermediate value at least approximately equal to the minimum possible power output quantity corresponding to the later transmission ratio, at which point reduction of the rate at which the instantaneous setpoint power output quantity approaches the target setpoint power output quantity is activated;

the change limitation is activated in an event of a gear shift at a first predetermined time, the change limitation remaining active until a second predetermined time; and subsequent to the second predetermined time, a time constant of the change limitation is brought to a value of 1, so that the instantaneous power output quantity approaches the target setpoint power output quantity at a third predetermined time.

11. A control and/or regulating device for an internal combustion engine, comprising:

an instruction set programmed on a computer that, when executed, causes the computer to perform the following steps:

determining an intended power output based on a gas pedal operation;

determining an instantaneous setpoint power output quantity of a drive unit from the intended power output, maximal possible output torque of an engine at nominal speed, and minimal possible output torque of an engine at an instantaneous speed, wherein the setpoint power output quantity is a function of an instantaneous transmission ratio of a transmission, at least for a given intended power output;

for a change limitation, reducing, at least intermittently, a rate at which the instantaneous setpoint power output quantity approaches a target setpoint power output quantity corresponding to a later transmission ratio, the reducing occurring at least one of during and after a change limitation period corresponding to a change in the instantaneous transmission ratio from an earlier transmission ratio to the later transmission ratio;

wherein:

if the instantaneous setpoint power output quantity corresponding to the earlier transmission ratio is less than a minimum possible power output quantity corresponding to the later transmission ratio, then, with the change in the transmission ratio, the instantaneous setpoint power output quantity is initially increased, without reducing the rate at which the instantaneous setpoint power output quantity approaches the target setpoint power output quantity, until the instantaneous setpoint power output quantity reaches an intermediate value at least approximately equal to the minimum possible power output quantity corresponding to the later transmission ratio, at which point reduction of the rate at which the instantaneous setpoint power output quantity approaches the target setpoint power output quantity is activated;

the change limitation is activated in an event of a gear shift at a first predetermined time, the change limitation remaining active until a second predetermined time; and subsequent to the second predetermined time, a time constant of the change limitation is brought to a value of 1, so that the instantaneous power output quantity approaches the target setpoint power output quantity at a third predetermined time.

12. An internal combustion engine for a motor vehicle, comprising:

a control and/or regulating device programmed with an instruction set that, when executed, causes the control and/or regulating device to perform the following steps:

determining an intended power output based on a gas pedal operation;

determining an instantaneous setpoint power output quantity of a drive unit from the intended power output, maximal possible output torque of an engine at nominal speed, and minimal possible output torque of an engine at an instantaneous speed, wherein the setpoint power output quantity is a function of an instantaneous transmission ratio of a transmission, at least for a given intended power output;

for a change limitation, reducing, at least intermittently, a rate at which the instantaneous setpoint power output quantity approaches a target setpoint power output quantity corresponding to a later transmission ratio, the reducing occurring at least one of during and after a change limitation period corresponding to a change in the instantaneous transmission ratio from an earlier transmission ratio to the later transmission ratio;

wherein:

if the instantaneous setpoint power output quantity corresponding to the earlier transmission ratio is less than a minimum possible power output quantity corresponding to the later transmission ratio, then, with the change in the transmission ratio, the instantaneous setpoint power output quantity is initially increased, without reducing the rate at which the instantaneous setpoint power output quantity approaches the target setpoint power output quantity, until the instantaneous setpoint power output quantity reaches an intermediate value at least approximately equal to the minimum possible power output quantity corresponding to the later transmission ratio, at which point reduction of the rate at which the instantaneous setpoint power output quantity approaches the target setpoint power output quantity is activated;

the change limitation is activated in an event of a gear shift at a first predetermined time, the change limitation remaining active until a second predetermined time; and subsequent to the second predetermined time, a time constant of the change limitation is brought to a value of 1, so that the instantaneous power output quantity approaches the target setpoint power output quantity at a third predetermined time.

* * * * *